United States Patent
Prasad et al.

(10) Patent No.: US 10,078,334 B2
(45) Date of Patent: Sep. 18, 2018

(54) VISION SENSING COMPENSATION

(71) Applicant: Delphi Technologies, Inc., Troy, MI (US)

(72) Inventors: Premchand Krishna Prasad, Carmel, IN (US); Michael I. Chia, Cicero, IN (US)

(73) Assignee: Delphi Technologies, Inc., Troy, MI (US)

( * ) Notice: Subject to any disclaimer, the term of this patent is extended or adjusted under 35 U.S.C. 154(b) by 80 days.

(21) Appl. No.: 15/371,635

(22) Filed: Dec. 7, 2016

(65) Prior Publication Data
US 2018/0157269 A1 Jun. 7, 2018

(51) Int. Cl.
*G06K 9/32* (2006.01)
*G05D 1/02* (2006.01)
*B60T 7/12* (2006.01)
*G06K 9/00* (2006.01)

(52) U.S. Cl.
CPC .............. *G05D 1/0246* (2013.01); *B60T 7/12* (2013.01); *G05D 1/0248* (2013.01); *G06K 9/00791* (2013.01); *G06K 9/00798* (2013.01); *G06K 9/3233* (2013.01); *B60R 2300/301* (2013.01); *B60T 2201/089* (2013.01); *B60T 2210/10* (2013.01); *G05D 2201/0213* (2013.01); *G06T 2207/30256* (2013.01)

(58) Field of Classification Search
CPC .......... G06K 9/00798; G06K 9/00791; G06K 9/3233; B60R 2300/301; G05D 1/0248; G06T 2207/30256
See application file for complete search history.

(56) References Cited

U.S. PATENT DOCUMENTS

| 7,872,764 | B2* | 1/2011 | Higgins-Luthman | B60G 17/019 280/5.5 |
| 8,676,508 | B2* | 3/2014 | Schwarz | B60W 40/072 342/70 |
| 9,355,319 | B2* | 5/2016 | Jang | G06K 9/00791 |
| 9,676,331 | B2* | 6/2017 | Hartmann | B60R 1/00 |
| 9,679,204 | B2* | 6/2017 | Hegemann | G06K 9/00805 |
| 9,770,959 | B2* | 9/2017 | Unger | B60G 17/0165 |
| 9,883,145 | B2* | 1/2018 | Kawai | H04N 7/18 |
| 2013/0103259 | A1 | 4/2013 | Eng et al. | |
| 2014/0320644 | A1* | 10/2014 | Hegemann | G06K 9/00798 348/140 |
| 2016/0048733 | A1* | 2/2016 | Jung | G06K 9/00798 382/104 |

(Continued)

FOREIGN PATENT DOCUMENTS

WO   03/093857 A2   11/2003

*Primary Examiner* — Todd Melton
(74) *Attorney, Agent, or Firm* — Lawrence D. Hazelton

(57) ABSTRACT

A lane-control system suitable for use on an automated vehicle comprising a camera, a lidar-sensor, and a controller. The camera captures an image of a roadway traveled by a host-vehicle. The lidar-sensor detects a discontinuity in the roadway. The controller is in communication with the camera and the lidar-sensor and defines an area-of-interest within the image, constructs a road-model of the roadway based on the area-of-interest, determines that the host-vehicle is approaching the discontinuity, and adjusts the area-of-interest within the image based on the discontinuity.

4 Claims, 3 Drawing Sheets

(56) References Cited

U.S. PATENT DOCUMENTS

2016/0291134 A1 10/2016 Droz et al.
2017/0243069 A1* 8/2017 Shen .................... G01B 11/002

* cited by examiner

VISION SENSING COMPENSATION

TECHNICAL FIELD OF INVENTION

This disclosure generally relates to a lane-control system suitable for use on an automated vehicle, and more particularly relates to a system that compensates the vision sensing.

BACKGROUND OF INVENTION

It is known to apply lane-keep assist and/or lane-centering methods to vehicles traveling roadways. These methods rely on the continuous feed of information from a vision system mounted on the vehicle. The loss of vision system data may cause the various lane-keep-assist and lane-centering methods perform sub-optimally, or fail to perform their intended function.

SUMMARY OF THE INVENTION

In accordance with one embodiment, a lane-control system suitable for use on an automated vehicle is provided. The lane-control system includes a camera, a lidar-sensor, and a controller. The camera is used to capture an image of a roadway traveled by a host-vehicle. The lidar-sensor is used to detect a discontinuity in the roadway. The controller is in communication with the camera and the lidar-sensor and defines an area-of-interest within the image, constructs a road-model of the roadway based on the area-of-interest, determines that the host-vehicle is approaching the discontinuity, and adjusts the area-of-interest within the image based on the discontinuity.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Roadways traveled by a host-vehicle 12 are seldom flat and smooth, and often contain irregularities such as pot holes, debris, and discontinuities from bridge overpasses and on-ramps that may have transient influences on the suspension and/or trajectory of the host-vehicle 12. Described herein is a lane-control system 10 that anticipates such a transient-event and maintains control of the host-vehicle 12 through the transient-event when the vision-system data may otherwise become disrupted.

Figure 1:
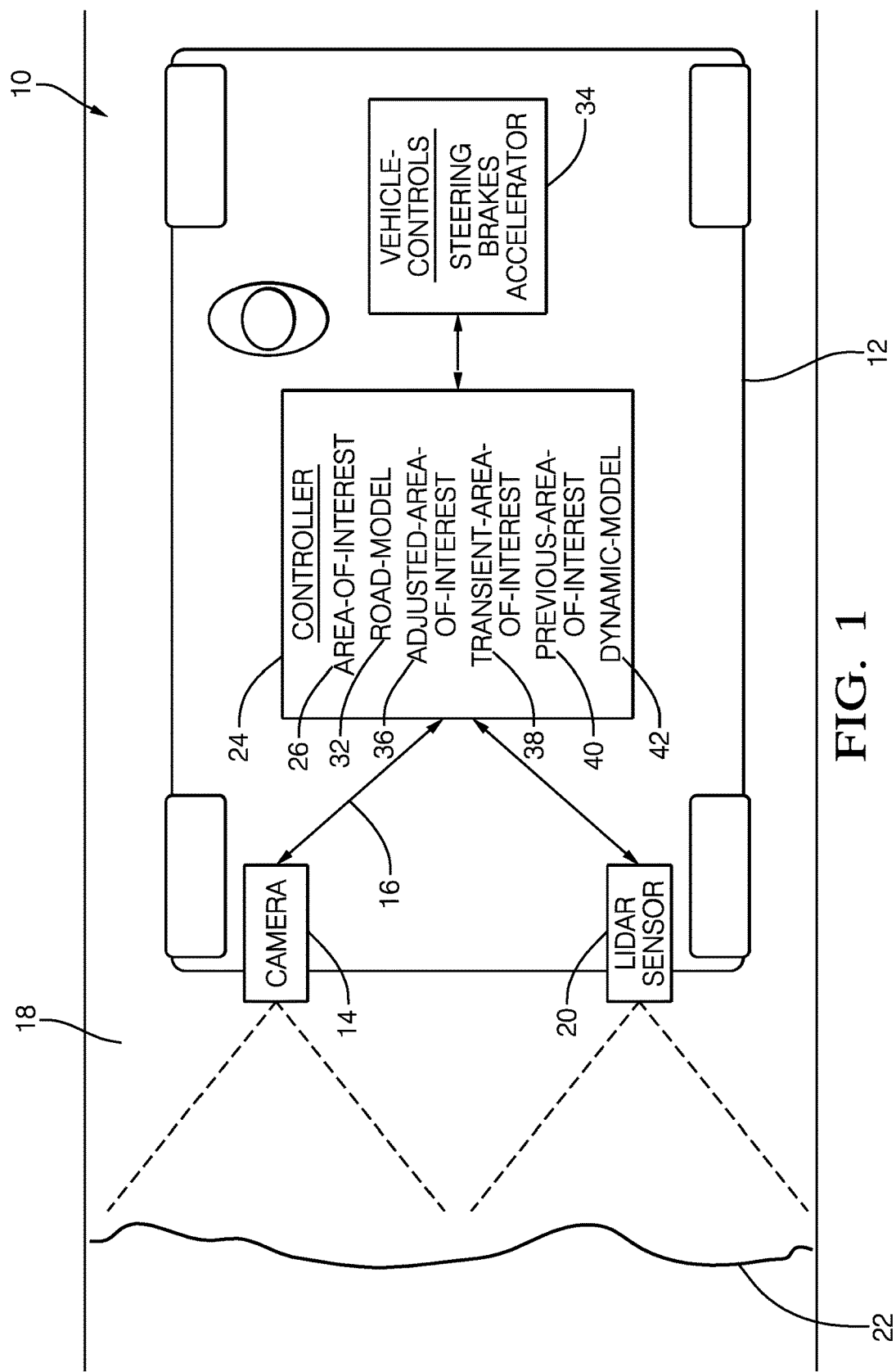
FIG. 1 is an illustration of a lane-control system in accordance with one embodiment.

FIG. 1 illustrates a non-limiting example of a lane-control system 10, hereafter referred to as the system 10, which is suitable for use on an automated vehicle, for example a host-vehicle 12. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing a lane-keep-assist (LKA) or a lane-centering (LC) to the human, and possibly operating the brakes of the host-vehicle 12 to prevent the host-vehicle 12 from entering a travel-path of an approaching vehicle.

The system 10 includes a camera 14 used to capture an image 16 of a roadway 18 traveled by the host-vehicle 12. Examples of the camera 14 suitable for use on the host-vehicle 12 are commercially available as will be recognized by those in the art, one such being the APTINA MT9V023 from Micron Technology, Inc. of Boise, Id., USA. The camera 14 may be mounted on the front of the host-vehicle 12, or mounted in the interior of the host-vehicle 12 at a location suitable for the camera 14 to view the area around the host-vehicle 12 through the windshield of the host-vehicle 12. The camera 14 is preferably a video type camera 14 or camera 14 that can capture images 16 of the roadway 18 and surrounding area at a sufficient frame-rate, of ten frames per second, for example.

The system 10 also includes a lidar-sensor 20 that may detect a discontinuity 22 in the roadway 18. The discontinuity 22 may be of any magnitude measurable by the lidar-sensor 20 (a few millimeters to several hundred millimeters for example) and may include, but is not limited to, a pothole, road debris, dip, peak, or a pavement transition, for example. The discontinuity 22 may span the entire width of the roadway 18, or may span only a portion of the roadway 18. The lidar-sensor 20 may detect the discontinuity 22 at a range in excess of two-hundred meters (200 m), based on the reflectivity of the discontinuity 22 and an unencumbered line-of-sight between the discontinuity 22 and the lidar-sensor 20.

The system 10 also includes a controller 24 in communication with the camera 14 and the lidar-sensor 20. The controller 24 may include a processor (not specifically shown) such as a microprocessor or other control circuitry such as analog and/or digital control circuitry including an application specific integrated circuit (ASIC) for processing data as should be evident to those in the art. The controller 24 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the discontinuity 22 in the roadway 18 is going to be in the intended path of the host-vehicle 12 based on signals received by the controller 24 from the lidar-sensor 20 and camera 14 as described herein.

Figure 2:
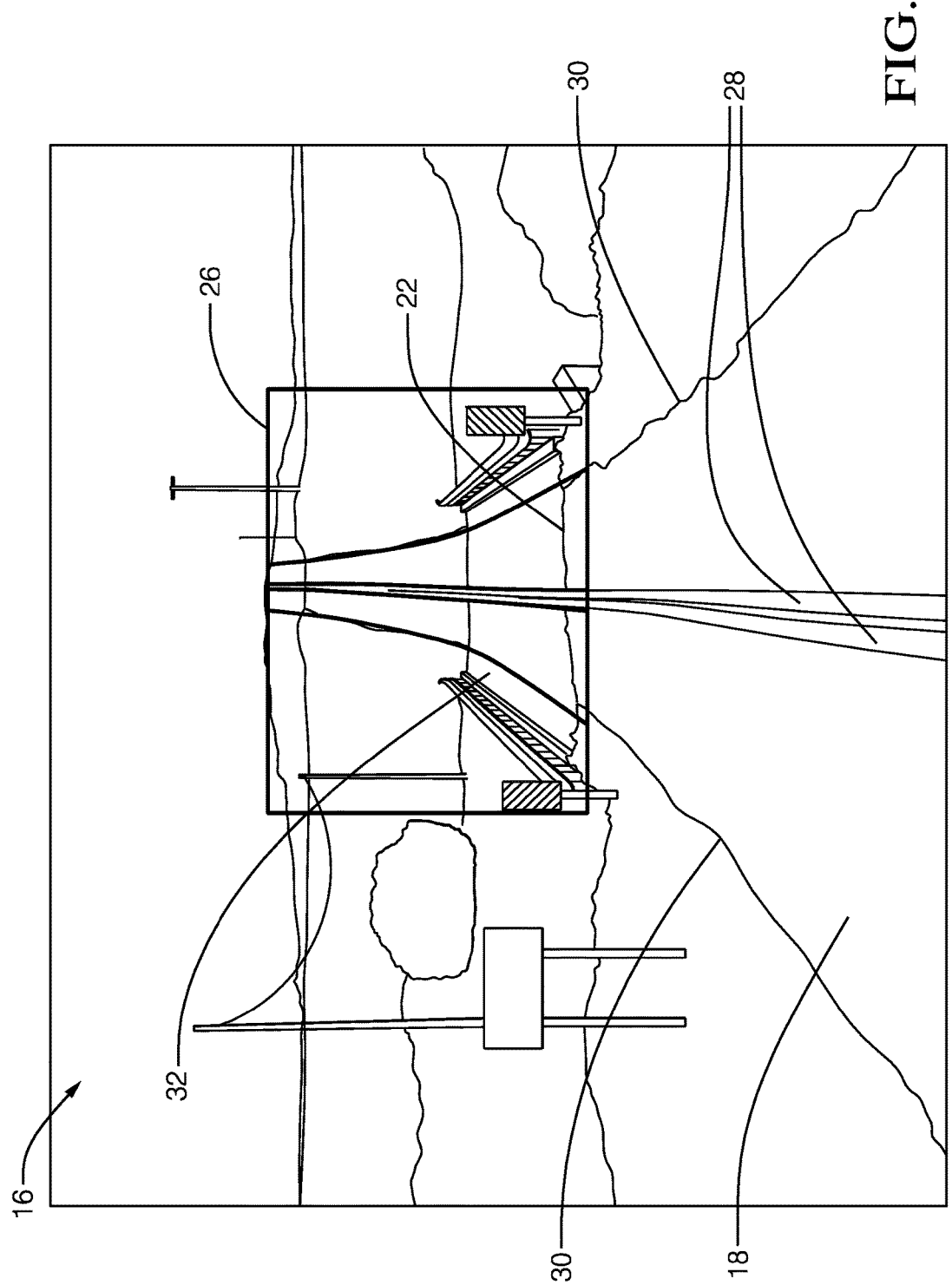
FIG. 2 is an illustration of an image in accordance with one embodiment.

The controller 24 may define an area-of-interest 26 (FIG. 2) within the image 16 to identify features of the roadway 18 including, but not limited to, lane-markings 28, road-edges 30, vanishing points, and other features characteristic of the roadway 18 that may be used for LKA and/or LC, and will be understood by one skilled in the art. FIG. 2. illustrates the area-of-interest 26 within the image 16 as captured by the camera 14. A bottom-edge of the area-of-interest 26 may be at any position in front of the host-vehicle 12, and preferably is located at a position that is 1.5 seconds ahead of the host-vehicle 12, regardless of a velocity (not shown) of the host-vehicle 12.

The controller 24 is further configured to construct a road-model 32 of the roadway 18 based on the features detected in the area-of-interest 26, as shown in FIG. 2. The road-model 32 may be updated with new information from the camera 14 and the lidar-sensor 20 as the host-vehicle 12 moves along the roadway 18. The road-model 32 may be updated at rate equal to the frame-rate of the camera 14, or may be updated at a slower rate to satisfy any computational limitations. Kalman filters may be used to track the lane-edges, for example, and will be recognized by those skilled in the art. The controller 24 may also assume some or all control of the vehicle-controls 34 (FIG. 1) of the host-vehicle 12 based on the road-model 32 as will be understood by one skilled in the art of autonomous controls.

The controller 24 is further configured to determine that the host-vehicle 12 is approaching the discontinuity 22 in anticipation of the aforementioned transient-event. Once the discontinuity 22 is detected by the lidar-sensor 20, the controller 24 may track the discontinuity 22 and determine a time-of-arrival to the discontinuity 22 based on the velocity of the host-vehicle 12 and based on the distance (not specifically shown) to the discontinuity 22. The time-of arrival may be updated at a rate equal to a clock-speed (not shown) of the controller 24, or at a slower rate to satisfy any computational limitations, or may be varied based on the velocity of the host-vehicle 12. The time-of-arrival may be stored in the memory of the controller 24 and may be associated with a track of the discontinuity 22.

Figure 3:
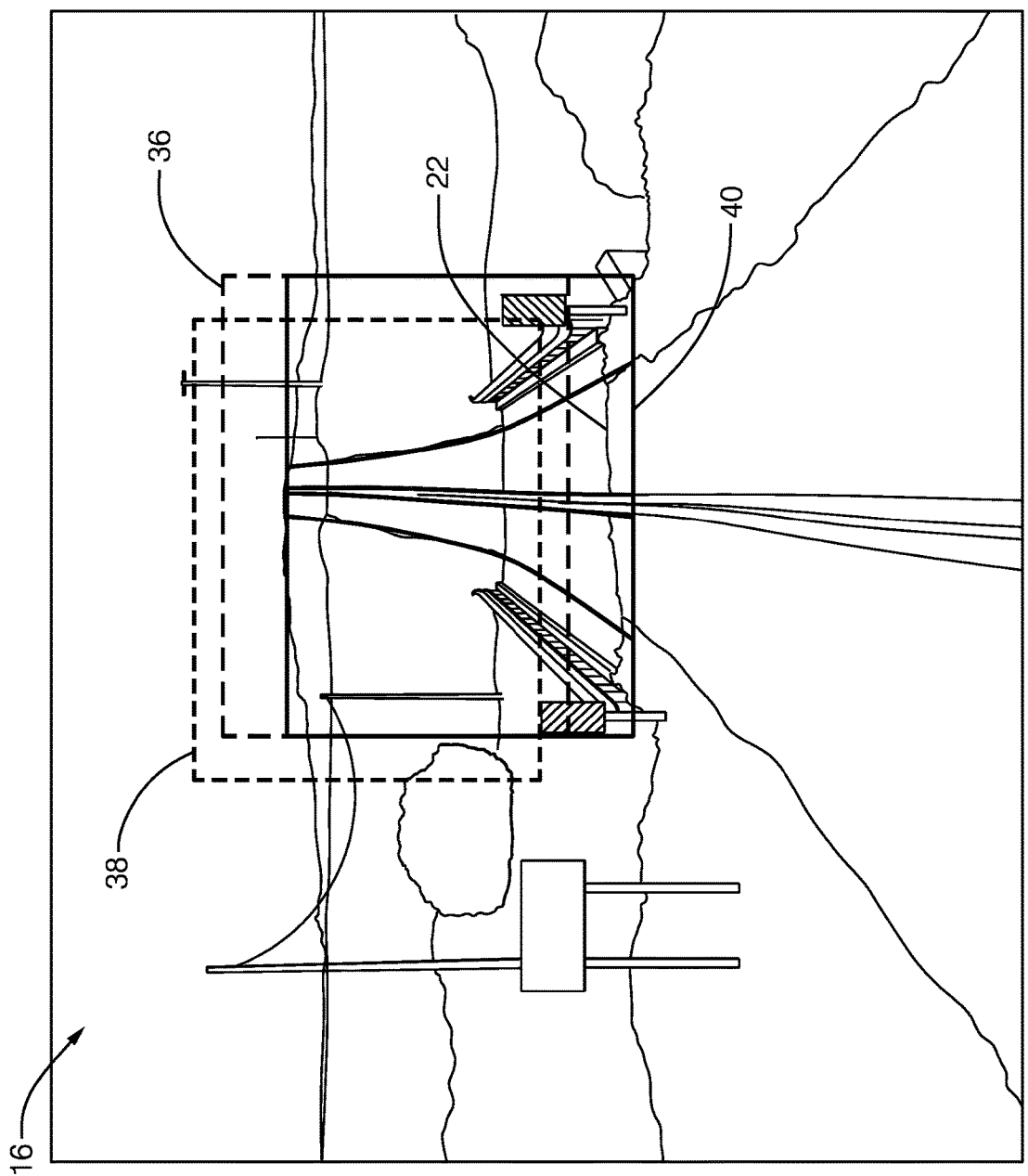
FIG. 3 is an illustration of an image in accordance with one embodiment.

The controller 24 is further configured to adjust the area-of-interest 26 within the image 16, in anticipation of the host-vehicle 12 arriving at the discontinuity 22, and based on the discontinuity 22 to create an adjusted-area-of-interest 36 (FIG. 3). The adjusted-area-of-interest 36 may be used to compensate for any missing data and/or induced-noise in the image 16 that occurs, such as an instantaneous change in the position of the lane-markings 28 in the image 16, while the host-vehicle 12 is traveling over the discontinuity 22 thus creating a disruption in a field-of-view of the camera 14 as the host-vehicle 12 reacts to the discontinuity 22. This disruption in the field-of-view of the camera 14 may lead to sub-optimal steering control where the steering commands from the controller 24 fluctuate. FIG. 3 illustrates the adjusted-area-of-interest 36 compared to a transient-area-of-interest 38, where the transient-area-of-interest 38 illustrates a view of the camera 14 at a moment in time after the host-vehicle 12 has reached the discontinuity 22, and the host-vehicle 12 is reacting to (e.g. pitching, jouncing, rolling, etc.) the discontinuity 22 by pointing the camera 14 in an upward and leftward direction, for example. In the non-limiting example illustrated in FIG. 3, as the host-vehicle 12 reaches the discontinuity 22 the adjusted-area-of-interest 36 is shifted rightward and downward relative to the transient-area-of-interest 38 to align with a previous-area-of-interest 40 to compensate for an impending-reaction of the host-vehicle 12 to the discontinuity 22. The previous-area-of-interest 40 is defined as the last area-of-interest 26 used to update the road-model 32 before the host-vehicle 12 reaches the discontinuity 22. As the host-vehicle 12 passes over the discontinuity 22, the road-model 32 may then be updated with information from the adjusted-area-of-interest 36, eliminating any disruption in updating the road-model 32 that may have occurred if the transient-area-of-interest 38 were relied upon, thereby enabling the controller 24 to steer the host-vehicle 12 as if there were no discontinuity 22. The duration of the transient-event may last for several seconds depending on the magnitude of the discontinuity 22, during which the road-model 32 is updated according to the adjusted-area-of-interest 36 until a transient-response of the host-vehicle 12 falls below a user defined threshold and a stable host-vehicle 12 reaction to the roadway 18 is re-established.

Using the adjusted-area-of-interest 36 to update the road-model 32 is beneficial because it requires less computational resources than some prior-art-systems that may track a reference-object in the image 16, so that the area-of-interest 26 can be adjusted in response to a movement of the reference-object. This tracking of the reference-object typically requires a significant amount of computational resources when the discontinuity 22 is sufficiently large such that the controller 24 is required to search the entire image 16 in order to re-locate the reference-object. In contrast, the system 10 described herein anticipates how the area-of-interest 26 will move in a future image 16 as a result of the discontinuity 22, which reduces the image-processing burden on the controller 24 because the entire image 16 need not be searched for the reference-object.

The controller 24 may use a transformation, such as an Affine-transformation and/or a Perspective-transformation to create the adjusted-area-of-interest 36 where the image 16 is rotated to account for an angle change in the field-of-view of the camera 14 and determine the real-world coordinates of the lane-markings 28. The controller 24 may determine the type of transformation required based on the discontinuity 22. That is, if the discontinuity 22 is detected to be a sudden vertical drop in the roadway 18 the controller 24 may use the Affine-transformation, for example. It the discontinuity 22 is detected to be a ramp, the controller 24 may use the Perspective-transformation, for example.

The controller 24 may use a dynamic-model 42 (FIG. 1) of the host-vehicle 12 to anticipate the reaction of the host-vehicle 12 to the discontinuity 22. The dynamic-model 42 estimates a dynamic-response of the host-vehicle 12 to various inputs, including, but not limited to, a suspension-input, a steering-input, a velocity-input, a wheel-speed input, and a cargo-load-input. The dynamic-model 42 may also include components such as aerodynamic, geometric, mass, motion, tire, and roadway 18 specific components that may describe the motion of the host-vehicle 12 under a variety of conditions, and will be understood by one skilled in the art.

Accordingly, a lane-control system 10, a camera 14, a lidar-sensor 20, and a controller 24 for the lane-control system 10 is provided. The lane-control system 10 is an improvement over other lane control systems because it anticipates discontinuities 22 in the roadway 18 and compensates for erroneous vision-system inputs.

While this invention has been described in terms of the preferred embodiments thereof, it is not intended to be so limited, but rather only to the extent set forth in the claims that follow. Moreover, the use of the terms first, second, upper, lower, etc. does not denote any order of importance, location, or orientation, but rather the terms first, second, etc. are used to distinguish one element from another. Furthermore, the use of the terms a, an, etc. do not denote a limitation of quantity, but rather denote the presence of at least one of the referenced items.

We claim:

1. A lane-control system suitable for use on an automated vehicle, said system comprising:

a camera used to capture an image of a roadway traveled by a host-vehicle;

a lidar-sensor used to detect a discontinuity in the roadway; and a controller in communication with the camera and the lidar-sensor, wherein the controller defines an area-of-interest within the image, constructs a road-model of the roadway based on the area-of-interest, determines that the host-vehicle is approaching the discontinuity, and adjusts the area-of-interest within the image based on the discontinuity.

2. The system in accordance with claim 1, wherein the controller further controls the host-vehicle based on the road-model.

3. The system in accordance with claim 1, wherein the controller adjusts the area-of-interest to align with a previous-area-of-interest.

4. The system in accordance with claim 1, wherein the controller adjusts the area-of-interest based on a dynamic-model of the host-vehicle.

\* \* \* \* \*